W. R. BARBOUR.
CLEAT FOR TRACTOR WHEELS.
APPLICATION FILED JULY 28, 1919.

1,375,665.

Patented Apr. 26, 1921.

Witness

Inventor
W. R. Barbour
By C. A. Snow & Co.
Attorneys

UNITED STATES PATENT OFFICE.

WOLSEY R. BARBOUR, OF TERRE HAUTE, INDIANA.

CLEAT FOR TRACTOR-WHEELS.

1,375,665.

Specification of Letters Patent.   Patented Apr. 26, 1921.

Application filed July 28, 1919.  Serial No. 313,790.

*To all whom it may concern:*

Be it known that I, WOLSEY R. BARBOUR, a citizen of the United States, residing at Terre Haute, in the county of Vigo and State of Indiana, have invented a new and useful Cleat for Tractor-Wheels, of which the following is a specification.

This invention relates to cleats for the traction wheels of motor propelled vehicles and is particularly intended for use on farm tractors.

The object of the invention is to provide novel means for securing the cleat to the rim of the wheel whereby the same may be easily and quickly removed from the rim.

A further object is the provision of a cleat that is substantial in design, that may be cheaply manufactured and that will withstand the strain imposed thereon by the tractive power of the vehicle to which it may be applied.

With these and other objects in view, to appear as the description proceeds, the invention resides in the novel form and arrangement of parts to be more fully described and particularly claimed, it being understood that slight changes may be made in the device, without departing from the spirit, or sacrificing any of the advantages of the invention.

Figure 1:
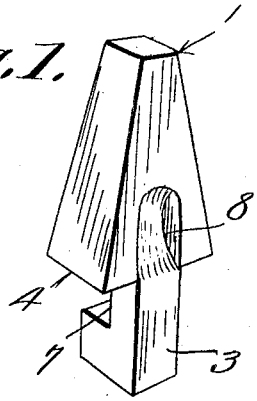
Figure 1 is a perspective view of the preferred embodiment of the invention.
Figure 2:
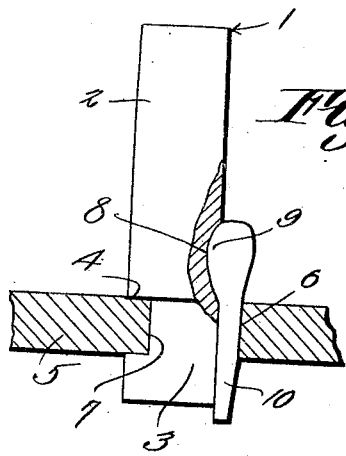
Fig. 2 is a sectional view of a wheel rim with the cleat in place thereon.

Referring to the drawing by characters of reference, there is shown at 1 a cleat comprising a head 2 and a shank 3, shoulders 4 formed at the base of the head are adapted to rest on the face of the wheel rim 5. An opening 6 formed in the rim receives the shank with one edge of the opening engaging a notch 7 in one of the lateral faces of the shank. A recess 8 is formed in the head 2 and is adapted to receive an enlargement 9 formed on the head of a key 10. The key 10 is driven into the opening 6 beside the shank and forces the notch 7 into engagement with the rim 5, thereby securely fastening the cleat to the wheel rim.

The key 10 is made of spring metal and has sufficient resiliency to permit the enlargement 9 to enter the recess 8.

Figure 3:
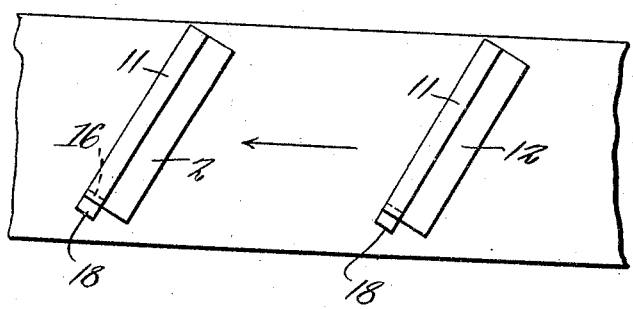
Fig. 3 is a plan view of a portion of a tractor wheel with a modified form of cleat attached thereto.
Figure 4:
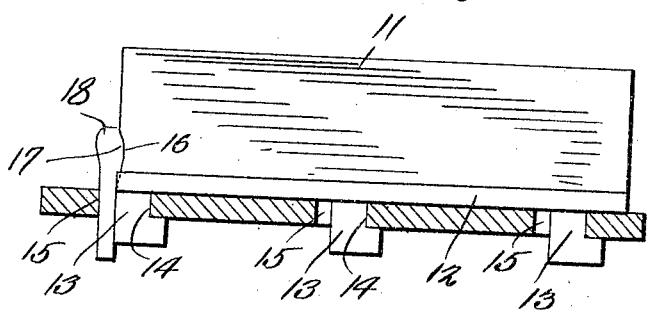
Fig. 4 is a sectional view of the same;
Figure 5:
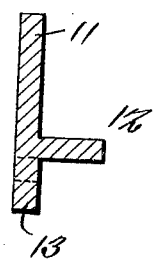
Fig. 5 is a transverse sectional view of the modified form.

The cleat shown in Figs. 3, 4, and 5 is intended for use where greater traction is desired than would be furnished by the cleat 2.

In this form the cleat comprises a member 11 of angular cross-section, the base 12 of which rests on the wheel rim. Lugs 13 are formed integral with the cleat and are each provided with a notch 14, which engages the edge of an opening 15 formed in the wheel rim. A recess 16 is formed in one end of the member 11 and receives an enlargement 17 on the head of a key 18.

The key 18 serves as does the key 10 to force the respective notch into engagement with the wheel rim and the inter-engaging recess and enlargement on the cleat and key prevent the accidental displacement of the key.

To remove the cleats, a hammer is the only tool required and the laborious task heretofore necessary to remove the cleats from tractor wheels is reduced to a minimum. It will here be observed that with the key arranged at the side of the cleat, no heavy strains are imposed thereon, from the pulling force of the tractor. In the modified form wherein the cleat is arranged diagonally of the line of draft there is a certain amount of end thrust, in this case the key is placed at the end, remote from that receiving the end thrust, thus preventing any undue strains on the key.

Having thus described the invention, what is claimed is:—

1. In combination with a wheel rim having an opening therein, of a cleat provided with a seating shoulder and a shank extending from the seating shoulder, the shank being adapted to enter the opening in the rim and having a notch for engaging the rim, a key for entering the opening in the rim to force the notch into engagement with the rim and inter-engaging elements on the cleat and key to prevent dislodgment of the key.

2. In combination with a wheel rim having a hole therein, of a cleat having a shank, the shank being provided with a notch for engaging the rim and means for holding the notch into engagement with the rim.

3. In combination with a wheel rim having a hole therein, of a cleat having a shank, the shank being provided with a notch for engaging the rim and a key for holding the notch in engagement with the rim, said key being provided with a resilient portion and adapted to interlock with one of the parts.

In testimony that I claim the foregoing as my own, I have hereto affixed my signature in the presence of two witnesses.

WOLSEY R. BARBOUR.

Witnesses:
 ART FAIRHURST,
 A. N. SMITH.